United States Patent

Steiman

[15] 3,647,120
[45] Mar. 7, 1972

[54] MIXING VALVE FOR DISPENSERS

[72] Inventor: Wolf Steiman, Fairfield, Conn.
[73] Assignee: VCA Corporation, Greenwich, Conn.
[22] Filed: Oct. 28, 1970
[21] Appl. No.: 84,840

[52] U.S. Cl. ........................................222/402.22
[51] Int. Cl. .........................................B65d 83/14
[58] Field of Search ..................222/402.21, 402.22, 402.23

[56] References Cited

UNITED STATES PATENTS

| | | | |
|---|---|---|---|
| 3,326,416 | 6/1967 | Hayes | 222/145 |
| 3,454,198 | 7/1969 | Flynn | 222/402.22 X |
| 3,525,456 | 8/1970 | Prussin et al. | 222/402.18 X |
| 3,547,405 | 12/1970 | Ewald | 222/402.22 X |

*Primary Examiner*—Samuel F. Coleman
*Assistant Examiner*—Norman L. Stack, Jr.
*Attorney*—H. Gibner Lehmann

[57] ABSTRACT

A tilt action mixing valve having a tiltable valve stem with an upper hollow portion and a side opening at a midway point, constituting a discharge passage. Below the side opening is a valve shoulder, engageable with an annular valve seat through which the hollow stem portion extends, for the purpose of shutting off the flow from within a tubular valve housing to the top of which the annular seat is sealed. The valve housing has two inlet openings, and is mounted at the top of a rigid outer container whose interior communicates with one of said openings. At its bottom the valve housing has the other opening, which communicates with a flexible, collapsible inner container having a different liquid from the outer container. At its inner end the said other opening has a valve seat, in the bottom housing wall, which is engaged by the bottom, solid end of the valve stem to control flow from the inner container into the housing. Tilting of the valve stem permits such flow. Surrounding the valve shoulder of the stem is a flexible seal skirt or cylinder constituting part of the housing. With the stem not tilted, this skirt seals to the shoulder and isolates the two inlet openings from each other. Tilting of the stem unseats both the stem shoulder and the stem bottom, and unseals the skirt from the shoulder. Pressurized liquid then flows from the two containers into the valve housing and out through the upper hollow portion of the stem, with mixing occurring only within the stem hollow portion. There is no mixing chamber as such, within the valve housing, and therefore no mixed residue remains, after a discharge, within the valve housing.

7 Claims, 10 Drawing Figures

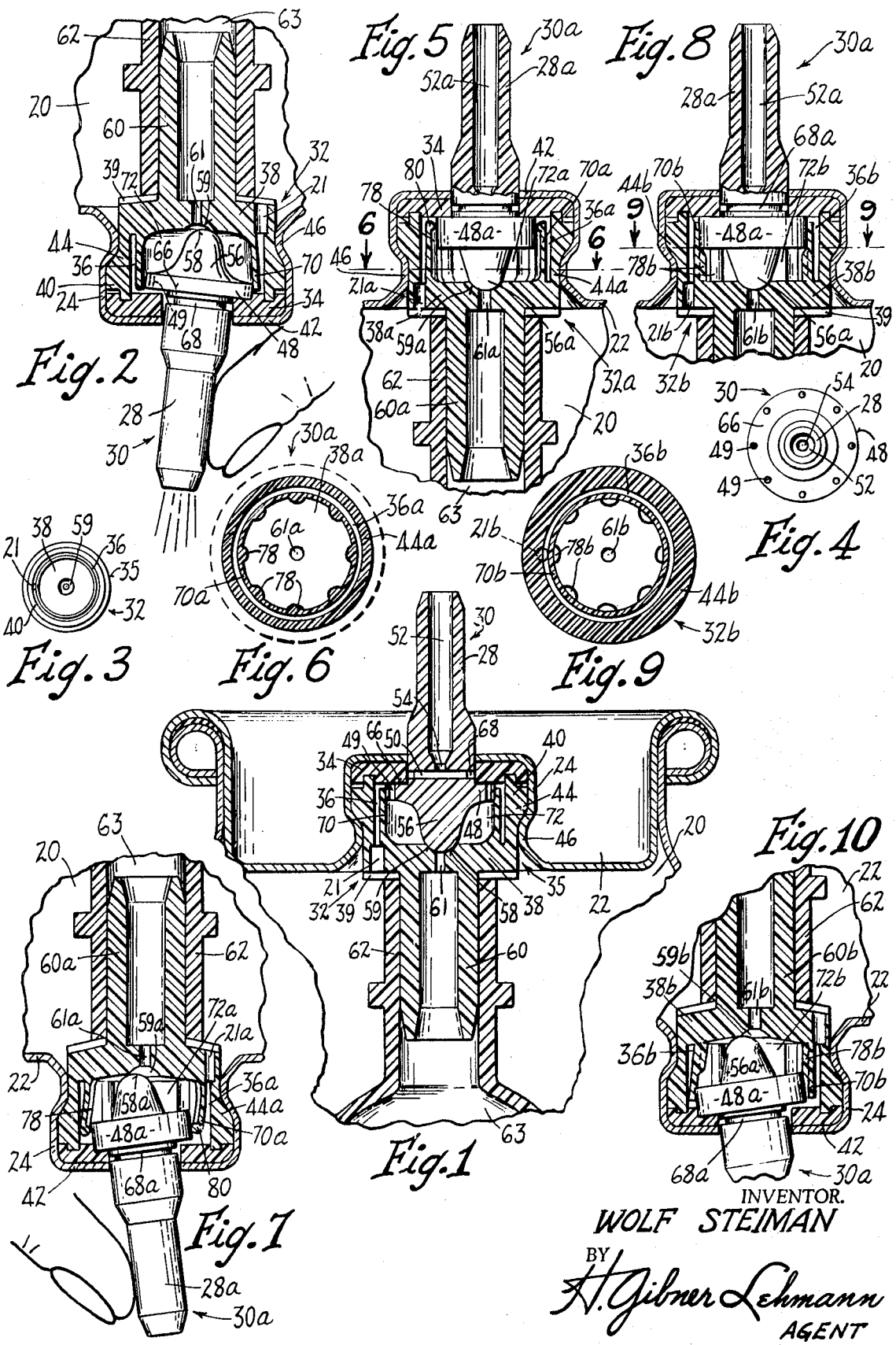

MIXING VALVE FOR DISPENSERS

CROSS REFERENCE TO RELATED APPLICATIONS

1. Copending application of Wolf Steiman, Ser. No. 843,906, filed June 30, 1969, entitled "Tilt Slide Action Aerosol Valve", and having the same ownership as the present application.

2. Copending application of Wolf Steiman, Ser. No. 44,760, filed June 9, 1970, entitled "Tilt Action Mixing Dispenser Valve", and having the same ownership as the present application.

BACKGROUND

This invention relates to mixing type dispensing valves, and more particularly to tilt valves wherein a hollow valve stem carrying a discharge fitting is tiltably mounted in a valve housing to control the discharge of multiple pressurized substances from the dispenser.

Heretofore valves of this type employed return springs, or else especially arranged spring-charged parts or molded resilient plastic valve or housing parts to effect the return or closing of the valve when the discharge was to be terminated. This meant additional components with consequent increased part and assembly costs, or else more expensive molds and more complicated plastic shapes which were likely to malfunction. Prior valves as a consequence could be unreliable, or unnecessarily high in relative cost or both, as well as being subject to contamination and the like. In prior valves, also, there always existed a mixing chamber, and this constituted a drawback since a residue mixture would remain in the valve housing after each discharge, diluting and interfering with the proper initial action of the dispenser upon the occasion of the next discharge.

SUMMARY

The above drawbacks and disadvantages of prior tilting type mixing valves are obviated by the present invention, one object being the provision of an improved tilt-type mixing valve which is self-closing or returning without requiring the use of return coil springs, or the use of especially arranged resilient plastic parts such as valve or valve-housing members, and which also eliminates entirely the mixing chamber that was heretofore always necessary. This is accomplished by the provision of a simple cuplike housing which is closed or covered by a resilient annular valve seat, and a cooperable shouldered valve stem which is engageable with the valve seat and which also has a slidably engageable valving projection engageable with an annular apertured valve seat in an opposite or bottom wall of the housing, the arrangement being such that the stem can be tilted due not only to the slide action but also to the capability of the shoulder to compress a localized area of the seat as a consequence of the tilting, and the capability of the opposite valve-seated bottom wall of the housing to flex or fulcrum about a rigid embracing cup which surrounds the housing. During the tilting, another part of the valve shoulder separates from the top seat to permit the discharge flow, while simultaneously the valving projection of the valve part separates from the seat of the opposite housing wall to permit inflow into the housing. The resilience of the valve seat and of the bottom housing wall thus provides for the return movement of the valve after the tilting force is removed therefrom, making unnecessary the conventional valve return coil spring, or the not so conventional special valve and valve-housing configuration heretofore relied on for this purpose. Additionally the valve housing has an upstanding sealing skirt which is engageable with the periphery of the shoulder on the valve stem, thereby to isolate two interior areas or chambers of the valve housing, with the result that the housing no longer provides a mixing chamber. Tilting of the valve stem enables a bypass to occur between the skirt and the valve shoulder, either by the use of ribs in the skirt or else by apertures in the shoulder which normally are closed by the resilient annular valve seat for the untilted valve position.

Other objects and advantages of the invention reside in the provision of an improved tilt-type dual valve as above set forth, wherein the components are particularly few and simple, inexpensive to produce and assemble, and wherein the multiple-valve action is especially easy as well as reliable.

Still other features and advantages will hereinafter appear.

In the drawings illustrating three different embodiments of the invention:

FIG. 1 is a fragmentary axial sectional view of the upper portion of a hand-held dispenser of the pressurized can type with plural containers, having incorporated in it the improved tilt slide action mixing valve and no mixing chamber as such. The valve is shown in its closed condition.

FIG. 2 is a view like that of FIG. 1, but inverted and showing the valve tilted and in the process of mixing and discharging liquid substances.

FIG. 3 is a top plan view on a reduced scale, of the valve housing.

FIG. 4 is a top plan view of the tiltable valve stem of FIGS. 1-3.

FIG. 5 is an axial sectional view like that of FIG. 1 but illustrating another embodiment of the invention, incorporating a ribbed sealing skirt in the valve housing.

FIG. 6 is a transverse section taken on the line 6—6 of FIG. 5.

FIG. 7 is an axial sectional view like that of FIG. 5 but showing the valve in the tilted, discharging position.

FIG. 8 is an axial sectional view like that of FIGS. 1 and 5 but illustrating still another embodiment of the invention.

FIG. 9 is a transverse sectional view taken on the line 9—9 of FIG. 8.

FIG. 10 is a fragmentary axial sectional view of the valve assemblage of FIG. 8 but showing the valve stem tilted and in the discharging position.

Considering first FIGS. 1 and 2, the multiple-fluid dispenser and improved no mixing chamber valve construction shown therein comprises a conventional pressurized can 20 provided at its upper end with a metal mounting cup 22, including a raised central inverted cup portion 24 adapted to carry the discharge valve assemblage and discharge tube.

In conjunction with the above there is provided a tilt slide action dual valve assemblage which is mounted in the cup portion 24, said assemblage having an absolute minimum number of parts of especially simple configuration whereby the component and assembly costs are especially low while at the same time there is had a dual-valve action characterized by a desirable ease and reliability of operation. The valve construction may mount a conventional resilient molded plastic discharge tube (not shown) which may be of a well-known type including a yieldable circular base or shield, said tube being carried by the hollow shank portion 28 of a multiple-valve stem member 30 shortly to be described.

As shown in the figures, in accordance with the invention the valve construction comprises essentially two simple molded plastic parts, the valve stem part 30 and a novel valve-housing part 32 together with a resilient, rubber washerlike valve seat 34. The novel valve housing 32 is molded of a suitable plastic substance which has appreciable resilience, such as Polyethylene of known formulation. The valve stem 30 is of rigid plastic substance, being molded of a material known commercially as "Delrin."

The housing 32 has a cuplike body portion 35 providing an annular chamber 36 for receiving liquid from the container 20 through a wall opening 21, said body including a transverse wall 38 which defines one side (the bottom) of the chamber. The valve seat 34, being resilient and constituted of rubber or rubberlike material, is apertured to receive the hollow shank portion 28 of the valve stem 30. The valve seat 34 constitutes an upper side of the chamber 36, being clamped against the annular rim portion 40 of the valve housing by the top wall 42 of the mounting cup portion 24.

The valve housing 32 has an annular outer ledge or shoulder 44 against which sidewall portions of the mounting cup are crimped as indicated at 46, thereby to retain the valve housing in its operative position with the rim portion 40 tightly sealed against the valve seat 34.

In accordance with this invention the valve stem 30 includes an annular valve shoulder 48 having a plurality of apertures 49, said shoulder being disposed adjacent the liquid-receiving chamber 36 of the housing 32 and being engageable with the resilient valve seat 34 to close the aperture thereof. The valve stem or part 30 also has a transverse or side passage 50 disposed adjacent the valve shoulder 48 and communicating with the hollow or bore 52 of the shank 28 by means of a throttling or metering aperture 54.

The valve part 30 further has a depending valving abutment portion 56 including a bulbous slide valving surface 58 which is engageable with and slidable on a recessed annular valve seat 59 including a passage 61 in the upper portion of the transverse wall 38 of the valve housing when the valve part is upright or is not being tilted. The portion 24 of the mounting cup 22 is apertured to provide appreciable clearance for and to admit the shank 28 of the valve part 30. The abutment portion 56, 58 of the valve part 30 preferably supports said part in the normally closed position of FIG. 1 wherein the valve shoulder 48 is engaged with the valve seat 34, thereby preventing egress of liquid from the chamber 36 through the hollow shank 28, and wherein the valving portion 56, 58 closes or stoppers the valve seat 59.

The valve housing 32 has a depending hollow boss 60 depending from the transverse wall 38, to which there is affixed a collar 62 of a flexible and collapsible inner container 63 disposed in the outer container 20 as shown.

The offset inlet opening 21 provided in the transverse wall 38 is eccentrically and externally located with respect to the boss 60 and the bore thereof whereby it is normally not only out of alignment with the valving abutment portion 56 of the valve part 30 as seen in FIG. 1 but can be effectively isolated therefrom as will be shortly brought out. With such construction, pressurized liquid in the container 20 can normally occupy the chamber 36 of the valve housing when the dispenser is inverted as seen in FIG. 2, reaching said chamber through the offset inlet opening 21.

Referring to FIG. 1, the side opening or transverse passage 50 of the valve part 30 is spaced upward a slight extent from the top or sealing face 66 of the valve shoulder 48, said passage extending completely through the stem and being preferably of square or rectangular cross-sectional configuration. The passage 50 communicates with an annular external groove 68 which is also spaced slightly above the top surface 66 of the valve shoulder 48. Such spacing provides for a more effective and leakproof closing of the valve. The throttling aperture 54 communicates with the transverse passage 50 whereby communication is established between the bore 52 of the shank portion 28 of the valve stem and the annular groove 68 thereof.

The bottom 58 of the nonyielding abutment portion 56 of the valve stem comprises the second valve of the assemblage and constitutes a slide surface or bulbous terminus which is engageable with the bottom valve seat 59 of the valve housing 32 and can effectively close off the passage 61 leading from the container 63 when the stem 30 is not tilted. The housing wall 38 is resilient and firmly affixed to the sidewalls 44 which are backed up by the annular cup wall 24 at points closely adjacent the wall 38. Thus the wall 38, in yielding to force from the valve 58 as the stem 30 tilts, flexes and fulcrums about the crimped portions 46 which are nonyielding. This action replaces the usual coil spring return of conventional spring-type valves, and is effective in enabling tilting of the stem for discharge, and in restoring the stem to the valve-closing position of FIG. 1.

By the present invention the housing 32 has no mixing chamber. It is, for this purpose, provided with an upstanding integral resilient skirt 70 which sealingly engages the periphery of the stem shoulder 48 when the stem 30 is upright as in FIG. 1. The skirt 70 thus isolates the chamber 36 from an inner chamber 72 as formed by the skirt 70. The plurality of apertures 48 of the shoulder 48 are normally sealed by the annular seat 34 for the nondischarge position of FIG. 1. The chamber 72, if it contains any residue liquid after a discharge has occurred, will contain only liquid from the container 63, which liquid has entered the chamber 72 through the passage 61. Such residue liquid will be trapped, since the valve 56, 58 is closed and the apertures 49 are closed. Isolation exists between this trapped liquid in chamber 72 and the liquid in chamber 36, due to the seal effected by the resilient skirt 70 engaged with the valve shoulder 48.

The operation of the improved, simplified tilt slide action dual valve of the invention as devoid of a mixing chamber in the valve housing may now be readily understood. Considering FIG. 1, the engagement of the abutment valving portion 56 of the valve part 30 with the resilient wall 38 of the valve-housing part 32 tends to maintain the valve shoulder 48 in engagement with the valve seat 34, and to maintain the apertures 49 closed. The pressure within the container 20 tends to maintain the valve shoulder 48 tightly sealingly engaged with the valve seat 34. And the force of the valving abutment 58 against the valve seat 59 seals off the seat, whereby the liquid in the flexible container 63 (under pressure from the contents of the container 20) remains isolated from the pressurized liquid in the container 20. As a consequence, no mixing of the liquids nor any discharge will normally occur, nor any leakage when the valve part 30 is in the nontilted or vertical position of FIG. 1. When it is desired to mix and discharge the contents of the containers 20 and 63, the valve stem 30 is tilted as by applying finger pressure to the discharge stem 28 as illustrated in FIG. 2. This will cause the valve shoulder 48 to compress a localized area of the valve seat 34 and flex downward the housing wall 38 as in FIG. 2, and will cause another part of the valve shoulder 48 to separate from the seat 34 at locations opposite to the localized indented portion of the seat, as well as clearing or opening some of the apertures 48 and also effecting separation of the valve 58 from the seat 59. Communication will thus be established between the chamber 36 and the bore 52 of the valve stem, by means of the annular groove 68 and transverse passage 50 as well as the throttling passage 54. Also, flow will occur into the chamber 36 from the container 20 through the inlet 21, and into the chamber 72 from the container 63 through the inlet 61. A mixing will occur in the bore 52 of the valve stem, and the mixture will be discharged from the mouth of the stem 28. This discharge will be constituted of liquids which have flowed through some of the openings 49 after having entered the chamber 72 via the center passage 61 from the container 63, and liquids from the container 20 via the passage 21 and chamber 36. The mixing occurs downstream of the valve 34, 48, and thus a residue mixture is never trapped in the valve housing 32 to impair future discharges. During tilting of the valve part 30 the abutment valving portion 56, 58 thereof will have slid along the top of the transverse wall 38 of the valve housing 32 and out of the valve seat 59, such sliding movement being facilitated by the resilience of the wall 38. Upon release of finger pressure, the tendency for the valve seat 34 to resume its normal, noncompressed condition will restore the valve stem part 30 to the vertical, sealing position of FIG. 1. By virtue of the provision of the annular groove 68 and the spacing of said groove and the passage 50 slightly above the top surface 66 of the valve shoulder 48 there is insured not only a reliable discharge regardless of the direction in which the valve stem is tilted but also a reliable shutoff of the flow without leakage when tilting finger force is removed from the spray head. Ribs 39 at the underside of the wall 38 prevent the collar 62 of the container 63 from closing off the inlet 21, which is thereby in effect recessed in the wall 38.

In the following description of other embodiments of the invention, parts which are similar but not identical to those already described have been given similar characters but with the suffixes *a* or *b* attached to them.

Another embodiment of the invention is illustrated in FIGS. 5, 6 and 7. This embodiment differs from that of FIGS. 1-4 in that the valve shoulder of the tiltable valve stem is devoid of apertures such as the apertures 74 seen in FIG. 4, and instead the isolating resilient skirt within the valve housing is provided with axially extended ribs to provide a bypass in the absence of the apertures in the valve shoulder.

In FIGS. 5-7 parts similar to those already described have been given similar numerals or characters. The assemblage includes a tiltable valve stem 30a having a discharge passage 52a and having a valving shoulder 48a. The stem 38a has a depending portion 56a which is cooperable with a valve seat 59a of the valve housing 32a. The chamber 36a in the valve housing 32a is isolated by an upstanding resilient skirt 70a provided with a plurality of axially extending inwardly disposed ribs 78 which meet an annular internal bead 80 at the top edge or rim portion of the skirt 70a. The bead 80 effects sealing engagement with the periphery of the valve shoulder 48a. The ribs 78 also engage the peripheral surface of the valve shoulder 48a and function to constitute a stiffening means for the skirt and to provide clearance space constituting a bypass passage.

Considering FIG. 7, when the valve stem 30a is tilted, the peripheral portion of the valving shoulder 48a will engage the internal ribs 78, and will distort the resilient skirt 70a in the manner indicated and establish clearance at the ribs. Accordingly, flow will be established from the chamber 72a past the valve shoulder 48a to the groove 68a of the valve stem. Otherwise, in general the functioning of the embodiment of FIGS. 5-7 is similar to that already described in connection with FIGS. 1-4.

Yet another embodiment of the invention is illustrated in FIGS. 8-10. Similar parts have been given similar characters, as with the previous embodiment. In FIGS. 8-10 the valve stem 30a is cooperable with a valve housing 32b which is provided with an integral upstanding resilient sealing skirt 70b having a plurality of internal axially extended ribs 78b. Normally, the upper ends of the ribs 78b engage the bottom peripheral edge portion of the valve shoulder 48a, as seen in FIG. 8, tending to maintain the valve stem 30a in the upright, closed condition or position. However, when the stem 30a is tilted as seen in FIG. 10 to effect a discharge, the valve shoulder 48a will engage and cam outward one or several of the ribs 78b distorting the sealing skirt 70b and effecting bypass discharge passages whereby liquid can pass from the chamber 72a to the annular groove 68a of the tilted valve stem 30a. The short ribs 78b not only stiffen the skirt 70b but also tend to return the valve stem 30a to the vertical nondischarging position by virtue of the pressure they exert on the valve shoulder 48a.

It will now be understood from the foregoing that I have provided a novel and improved tilt and slide action dual valve assemblage wherein the valve housing is devoid of a mixing chamber which could collect undesired mixed liquid residue, and wherein there are the fewest possible components, said components being of simple construction and being readily produced at a low cost. The components may be assembled without difficulty, utilizing automatic feeds and the like in assembling machines, and no special orientation of the valve stem with respect to the remainder of the parts is required during assembly, since the direction of tilt to effect a discharge is not critical. It will be especially noted that no valve return coil spring is required in order to restore the valve stem to the closed vertical position, nor will the chamber 36 even be shut off from the interior of the container 20 with the valve closed, inasmuch as the inlet passage 21 is offset or eccentrically located.

Variations and modifications are possible without departing from the spirit of the invention.

I claim:

1. A mixing valve construction for a dispenser of the type having two containers for two different liquids respectively, comprising in combination:
  a. a valve housing having a pair of chambers open at their tops and adapted for respectively receiving liquids from several containers, and having a bottom wall common to said chambers, said bottom wall having an annular valve seat,
  b. a resilient, annular valve seat constituting the top walls of said chambers,
  c. a valve part having a hollow shank portion extending through an aperture in said resilient valve seat,
  d. said valve part having an annular valve shoulder disposed in one chamber of the valve housing and arranged for engagement with the resilient valve seat to close the aperture thereof,
  e. said valve part having a side passage disposed adjacent the valve shoulder and communicating with the hollow of the shank portion, said valve part further having a depending valving portion engageable with and slidable over the annular valve seat of the bottom wall of the valve housing when the valve part is tilted, thereby to either close or open said bottom wall valve seat,
  f. said valve housing having in it an upstanding resilient annular skirt carried by the bottom wall thereof and at its top engaging and sealing with the periphery of said valve shoulder, said skirt constituting a partition between said chambers and thereby isolating the chambers from each other,
  g. means providing a bypass passage from the chamber within said skirt through said valve shoulder when the valve part is tilted,
  h. tilting of the valve part unseating both the depending valving portions thereof and the shoulder thereof respectively from the bottom wall valve seat and the top valve seat of the housing and shifting the valve shoulder on the upstanding skirt whereby liquids from both the chambers can flow into the hollow shank portion through the said side passage.

2. A valve construction as in claim 1, wherein:
  a. the valve housing has a hollow boss depending from the valve seat of said transverse bottom wall, and
  b. a container connected to said hollow boss, for supplying liquid to the chamber of the valve housing.

3. A valve construction as in claim 2, wherein:
  a. the valve housing has an opening in a wall thereof, and
  b. a second container surrounding the valve housing and communicating with one of the chambers thereof through said opening.

4. A valve construction as in claim 1, wherein:
  a. the means providing the bypass passage comprises apertures in the valving shoulder,
  b. said apertures normally being closed by said resilient valve seat when the valve part is not tilted.

5. A valve construction as in claim 1, wherein:
  a. the means providing the bypass passage comprises ribs on the interior of the resilient upstanding skirt, effecting a spacing of skirt portions from the valving shoulder when the valve part is tilted.

6. A valve construction as in claim 5, wherein:
  a. the ribs of the skirt terminate short of the upper rim of the skirt.

7. A valve construction as in claim 5, wherein:
  a. the resilient skirt has an internal bead on its upper rim, connected with the ribs of the skirt and engaging the periphery of the valving shoulder.

* * * * *